May 2, 1967     H. L. RUETER ETAL     3,317,293
RARE EARTH CHLORIDES IN A GLASS POLISHING COMPOSITION
Filed April 20, 1964
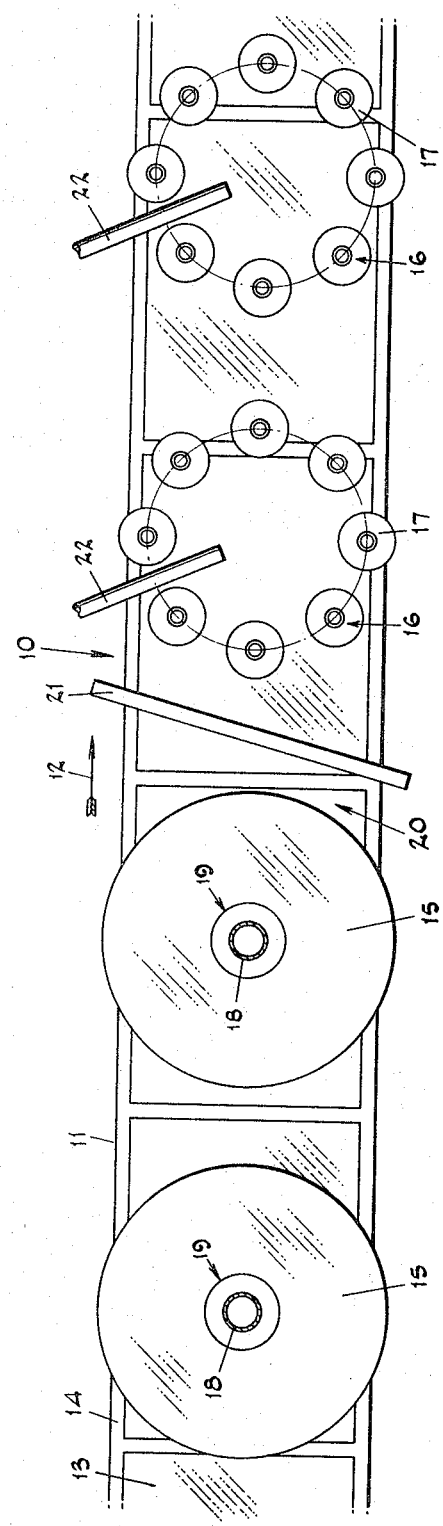
INVENTORS
Harold L. Rueter and
BY Lazarus D. Thomas
Nobbe & Swope
ATTORNEYS

United States Patent Office 3,317,293
Patented May 2, 1967

3,317,293
RARE EARTH CHLORIDES IN A GLASS POLISHING COMPOSITION
Harold L. Rueter, Toledo, and Lazarus D. Thomas, Maumee, Ohio, assignors to Libbey-Owens-Ford Glass Company, Toledo, Ohio, a corporation of Ohio
Filed Apr. 20, 1964, Ser. No. 360,967
15 Claims. (Cl. 51—307)

The present invention relates broadly to the surfacing of glass and more particularly to a novel method and composition for polishing the previously ground surfaces of a plate glass blank or ribbon.

As is well known, plate glass is produced commercially by first rough forming a more or less continuous ribbon from a mass of molten glass and then surfacing one or both sides thereof while the glass, either as a ribbon or as individual blanks that have been cut therefrom, is moved continuously along a predetermined path. During such surfacing the glass is passed first through a grinding area and then through a polishing area. In the grinding area, at least one surface is subjected to the abrasive action of sand of progressively decreasing coarseness under heavy iron runners; and in the polishing area the previously ground surface is polished with rouge under relatively soft pads such as wool or hair felt.

This polishing with rouge (iron oxide), in a water slurry and with copperas added, has been practiced in the plate glass industry for a great mny years and, until very recently, it has remained the conventional and most generally accepted method of polishing previously ground plate glass blanks although various other polishing materials and mixtures have been suggested and tried from time to time in an effort to obtain faster and/or better controlled polishing.

For example, cerium oxide is well known as a polishing agent in the optical glass industry, but had not been considered applicable to the commercial polishing of plate glass; first, because of its relatively high cost as compared with iron oxide; second, because it often produces a dull surface effect on the finished glass by reason of a characteristically cloudy film which it leaves and which, once formed, is very difficult to remove; and, third, because its polishing rate is not particularly high.

However we have found that, by the use of a special additive, a novel polishing composition can be formulated, with cerium oxide as a principal ingredient, that will give notably improved results in the final finishing of plate glass.

The special additive is a rare earth chloride or a mixture of rare earth chlorides and may be used to improve the action of other polishing agents such as rouge. However the preferred formulation here includes essentially the additive with cerium oxide and water.

In laboratory polishing tests, conducted with ground plate glass blanks and using conventional hair felt polishing tools, we have found that the composition of this invention is capable of polishing approximately one and one-half times as fast as the conventional rouge-copperas-water slurry under the same conditions and that, at the same time, it will produce a bright, clear and highly transparent polished surface. Moreover it can be used as a wet polishing medium at the end of a commercial plate glass polishing line without forming objectionable "drag" or "orange-peel." This produces several times the polishing work of a rouge polisher, which must be used dry at this location to minimize the formation of the "drag."

It is therefore a primary object of this invention to provide a novel method of polishing plate glass blanks that will give an improved finish in a shorter time than has heretofore been considered possible.

Another object is the provision for use in such a method of a novel and improved composition of polishing materials.

Another object is to provide a relatively inexpensive additive material that will overcome the defects and improve the polishing action of cerium oxide-water slurries.

Still another object is to provide improved polishing of previously ground plate glass blank surfaces with conventional soft polishing tools and a special slurry or polishing compound made up essentially of cerium oxide, a rare earth chloride or a mixture of rare earth chlorides and water.

The invention also contemplates using an intermediate product of a commercial recovery procedure as one source of the rare earth chloride or mixture of rare earth chlorides.

Further objects and advantages of the invention will become more apparent during the course of the following description when taken in connection with the accompanying drawing.

In the drawing, wherein like numerals are employed to designate like parts throughout the same:

The single figure is a fragmentary, diagrammatic, plan view of one type of continuous grinding and polishing line upon which the method of the invention may be practiced.

Referring now more particularly to the drawing, there is designated generally by the numeral 10 a conventional type of plate glass grinding and polishing line that is made up of a series of tables 11 mounted for continuous horizontal movement in the direction of the arrow 12 and adapted to receive a series of plate glass blanks 13 arranged in end-to-end relation and embedded in a layer of plaster 14 on the tables.

As the tables 11 are moved forwardly, the glass sheets carried thereby will be moved, first beneath a series of rotating grinding tools 15, and then beneath a series of rotating polishing runners 16 each of which includes a plurality of felt covered polishing tools 17 mounted for independent rotary movement on their own axes.

During passage of the glass sheets beneath the grinding runners 15, a mixture of sand and water is fed between the runners and the glass through a conduit 18 in the shaft 19 of the runner; and, as the glass passes through the area 20, between the grinding runners 15 and the polishing runners 16, the sand and water employed during the grinding action is removed from the glass surface by means of suitable squeegees 21 on the like. During subsequent passage beneath the polishing tools 16, the polishing composition of the invention is fed onto the glass surface and between the polishing tools and the glass. This may be done in any suitable manner, such as by means of pipes or hoses 22.

As indicated above, the special polishing composition or compound of the invention comprises a slurry of cerium oxide and water to which there has been added a rare earth chloride or a mixture of rare earth chlorides. Obviously individual rare earth chlorides can be obtained in more or less commercially pure form and used or mixed as desired. Also mixtures of rare earth elements and rare earth compounds are found in nature and at least some of these are, or can be treated to make them suitable for use in the polishing composition of this invention.

Generally speaking, the principal requirement for the additive in our special cerium oxide-water polishing composition is that it be or contain cerous chloride as the principal ingredient. When a naturally occurring mixture of rare earth elements is used as the source of a mixture of rare earth chlorides, lanthanum chloride and neodymium chloride are usually present as additional principal ingredients and have been found to be satisfactory. Good results have also been obtained with praseodymium chloride, samarium chloride, gadolinium chloride and yttrium chloride present as minor ingredients in the mixture, as well as other rare earth chlorides in trace or minor amounts. Materials other than the rare earth chlorides may also be tolerated in small amounts as impurities.

Consequently, the addition chloride, or mixture of chlorides of the invention can be made up from individual ingredients or from combinations of the required, desired or permissible components or by employing, with treatment, naturally occurring mixtures which include compounds of the required rare earths.

As an example of the latter procedure, monazite sand is probably the best source of the rare earths, and the recovery of thorium from monazite sand is a recognized commercial procedure which leaves as one intermediate product a mixture of rare earth elements or compounds that can be treated to give a mixture of rare earth chlorides.

Such a rare earth chloride mixture from at least one commercial source has the following approximate composition:

| | Percent |
|---|---|
| Cerous chloride ($CeCl_3 \cdot 6H_2O$) | 45.4 |
| Lanthanum chloride ($LaCl_3 \cdot 6H_2O$) | 23.8 |
| Neodymium chloride ($NdCl_3 \cdot 6H_2O$) | 16.6 |
| Praseodymium chloride ($PrCl_3 \cdot 6H_2O$) | 4.8 |
| Samarium chloride ($SmCl_3 \cdot 6H_2O$) | 2.9 |
| Gadolinium chloride ($GdCl_3 \cdot 6H_2O$) | 2.1 |
| Yttrium chloride ($YCl_3 \cdot 6H_2O$) | 0.3 |

It will be seen that cerous chloride predominates in this mixture; that cerous chloride, lanthanum chloride and neodymium chloride are the principal constituents while praseodymium chloride, samarium chloride, and yttrium chloride are present in minor amounts. There may also be traces of such other rare earth chlorides as thulium chloride, holmium chloride, and dysprosium chloride and other materials as impurities in very minor or trace amounts.

The above addition mixture, derived from a naturally occurring mixture of rare earth compounds and containing approximately 45% cerous chloride, may be said to be representative of the type of rare earth chloride mixtures we have used although it should be appreciated that considerable variations in the percentages of the various ingredients can be accepted without materially affecting the results.

In employing the composition of the invention, with the mixture of rare earth chlorides, for the continuous polishing of plate glass, our best work has been done with a relatively dilute slurry made up with 100 parts by weight of water, from 1 to 6 parts cerium oxide and from 0.5 to 2 parts of the mixture of rare earth chlorides. However, for all-around use excellent results may be had with a composition made up of 100 parts by weight of water, from .5 to 20 parts of cerium oxide and from 0.5 to 5 parts of the rare earth chloride mixture.

This means that the amount of cerous chloride in these compositions may range from approximately .225 to 2.25 parts; and a composition made up of .225 to 2.25 parts cerous chloride with from .5 to 20 parts cerium oxide in 100 parts of water can also be used effectively.

Surprisingly enough we have found that the presence of this rare earth chloride or of the mixture of rare earth chlorides in the indicated amounts notably improves the normal polishing efficiency of the cerium oxide in the water slurry. Moreover, it prevents formation of the cloudy film that has heretofore presented a problem when cerium oxide was employed in the dilute slurries that have to be used for production line polishing of plate glass blanks; it alleviates problems of "drag" and "orange-peel" that would otherwise arise under these conditions; and it stabilizes the polishing action.

In the following Example I there is listed a preferred composition of the special polishing slurry of the invention employing cerous chloride alone as the additive; and, in Example II, a preferred composition employing the mixture of rare earth chlorides as the additive:

Example I

| | | |
|---|---|---|
| Water | gals | 500 |
| Cerium oxide | lbs | 150 |
| Cerous chloride | lbs | 22.5 |

Example II

| | | |
|---|---|---|
| Water | gals | 500 |
| Cerium oxide | lbs | 150 |
| Mixture of rare earth chlorides | lbs | 50 |

A table of comparative values based on laboratory tests with the composition of Example II and standard cerium oxide and rouge slurries is set forth below:

| Polishing Agent (Standard slurries) | Finish (Louviaux grade) | Removal (Micro-inches in 15 minutes) |
|---|---|---|
| Cerium oxide | 4.0 to 6.0 | 120 to 50 |
| Rouge | 4.0 | 120 |
| Cerium oxides+rare earth chloride | 2 | 200 |

From this it is apparent that the special additives of this invention not only improve the finish and rate of polishing obtainable with cerium oxide polishing compounds but also give a notable improvement in stability.

It will be noted that the rare earth chlorides in the composition of the representative commercial mixture listed above have been expressed in terms of the rare earth chloride hexahydrates. This has been done because the hydrates are a convenient and easily usable form and to provide a common denominator. Obviously, however, the rare earth chlorides may be present in a mixture or may be introduced into the polishing composition in other ways than as the hexahydrates.

In fact, it is to be understood that the forms of the invention herewith shown and described are to be taken as illustrative embodiments only of the same, and that various changes in the number, order of addition and character of ingredients, as well as various procedural changes may be resorted to without departing from the spirit of the invention as defined in the subjoined claims.

We claim:

1. In a method of finishing a glass surface, the step of rubbing a slurry of water, cerium oxide and a mixture of rare earth chlorides containing approximately 45% cerous chloride, in the proportions of 100 parts by weight of water, from 0.5 to 20 parts by weight of cerium oxide and from 0.5 to 5 parts by weight of the mixture of rare earth chlorides, over said surface with a soft tool.

2. A method as defined in claim 1 in which the rare earth chlorides are hexahydrates.

3. In a continuous method of finishing a ground surface of a plate glass blank, the steps of moving said surface along a fixed path and during said movement rubbing said ground surface with a slurry of water, cerium oxide and a mixture of rare earth chlorides containing approximately 45% cerous chloride in proportions of 100 parts by weight of water to from 1 to 6 parts by weight of cerium oxide and from 0.5 to 2 parts by weight of the mixture of rare earth chlorides, over said surface with a relatively soft tool.

4. A method as defined in claim 1 in which the mixture of rare earth chlorides also contains lanthanum chloride and neodymium chloride.

5. A method as defined in claim 4 in which the mixture of rare earth chlorides contains minor amounts of praseodymium chloride, samarium chloride, gadolinium chloride and yttrium chloride.

6. A method as defined in claim 1 in which the composition of the mixture of rare earth chlorides, calculated as the hexahydrates, is approximately as follows by weight:

| | Percent |
|---|---|
| Cerous chloride ($CeCl_3 \cdot 6H_2O$) | 45.4 |
| Lanthanum chloride ($LaCl_3 \cdot 6H_2O$) | 23.8 |
| Neodymium chloride ($NdCl_3 \cdot 6H_2O$) | 16.6 |
| Praseodymium chloride ($PrCl_3 \cdot 6H_2O$) | 4.8 |
| Samarium chloride ($SmCl_3 \cdot 6H_2O$) | 2.9 |
| Gadolinium chloride ($GdCl_3 \cdot 6H_2O$) | 2.1 |
| Yttrium chloride ($YCl_3 \cdot 6H_2O$) | 0.3 |

7. A composition for use in polishing glass consisting essentially of water, cerium oxide and a mixture of rare earth chlorides containing approximately 45% cerous chloride in proportions of 100 parts by weight of water, from 0.5 to 20 parts by weight of cerium oxide and from 0.5 to 5 parts by weight of the mixture of rare earth chlorides.

8. A composition for use in polishing rough ground plate glass surfaces consisting essentially of 100 parts by weight of water, from 1 to 6 parts by weight of cerium oxide and from 0.5 to 2 parts by weight of a mixture of rare earth chlorides containing approximately 45% cerous chloride.

9. A composition as defined in claim 7 in which the composition of the mixture, calculated as the hexahydrates, is substantially as follows by weight:

| | Percent |
|---|---|
| Cerous chloride ($CeCl_3 \cdot 6H_2O$) | 45.4 |
| Lanthanum chloride ($LaCl_3 \cdot 6H_2O$) | 23.8 |
| Neodymium chloride ($NdCl_3 \cdot 6H_2O$) | 16.6 |
| Praseodymium chloride ($PrCl_3 \cdot 6H_2O$) | 4.8 |
| Samarium chloride ($SmCl_3 \cdot 6H_2O$) | 2.9 |
| Gadolinium chloride ($GdCl_3 \cdot 6H_2O$) | 2.1 |
| Yttrium chloride ($YCl_3 \cdot 6H_2O$) | 0.3 |

10. In a method of finishing a glass surface, the step of polishing said surface by rubbing thereover a mixture of water, cerium oxide and cerous chloride, in proportions of 100 parts by weight of water, from 0.5 to 20 parts by weight of cerium oxide and from .225 to 2.25 parts by weight of cerous chloride.

11. A polishing composition for use in the finishing of rough ground plate glass surfaces which comprises in 100 parts by weight of water, from 0.5 to 20 parts by weight of cerium oxide and from .225 to 2.25 parts by weight of cerous chloride.

12. In a method finishing a glass surface, the step of rubbing a slurry of water, cerium oxide and cerous chloride, calculated as the hexahydrate, in approximately the following proportions:

| | |
|---|---|
| Water | gals__ 500 |
| Cerium oxide | lbs__ 150 |
| Cerous chloride | lbs__ 22.5 | over said surface with a soft tool.

13. In a method of finishing a glass surface, the step of rubbing a slurry of water, cerium oxide and a mixture of rare earth chlorides containing approximately 45% cerous chloride, calculated as the hexahydrates, in approximately the following proportions:

| | |
|---|---|
| Water | gals__ 500 |
| Cerium oxide | lbs__ 150 |
| Mixture of rare earth chlorides | lbs__ 50 | over said surface with a soft tool.

14. In a method of finishing a glass surface by rubbing a water slurry of cerium oxide over said surface with a soft tool, the step of adding a rare earth chloride to said slurry prior to said rubbing.

15. In a method of finishing a glass surface by rubbing a water slurry of polishing oxide selected from the group consisting of cerium oxide and iron oxide containing from 0.5 to 20 parts by weight of polishing oxide to 100 parts by weight of water over said surface with a soft tool, the step of adding from .225 to 2.25 parts by weight of cerous chloride to said slurry prior to said rubbing.

References Cited by the Examiner
UNITED STATES PATENTS

| 2,865,725 | 12/1958 | Schroeder | 51—303 |
| 3,097,083 | 7/1963 | Silvernail | 51—309 |
| 3,131,039 | 4/1964 | Nonamaker | 51—309 |
| 3,158,971 | 12/1964 | Best | 51—309 |
| 3,240,580 | 3/1966 | Alexander et al. | 51—307 |

ALEXANDER H. BRODMERKEL, *Primary Examiner.*

MORRIS LIEBMAN, *Examiner.*

D. J. ARNOLD, *Assistant Examiner.*